United States Patent
Cho et al.

(10) Patent No.: US 10,294,618 B2
(45) Date of Patent: May 21, 2019

(54) FRICTION DAMPER WITH V-GROOVE

(71) Applicant: ESCO RTS CO., LTD., Seoul (KR)

(72) Inventors: Yeoung Cheol Cho, Seoul (KR); Yong Soo Ji, Gyeonggi-do (KR); Joon Ho Baek, Daejeon (KR); Chan Young Lee, Incheon (KR); In Seok Bang, Incheon (KR)

(73) Assignee: ESCO RTS CO., LTD., Seoul (KR)

( * ) Notice: Subject to any disclaimer, the term of this patent is extended or adjusted under 35 U.S.C. 154(b) by 0 days.

(21) Appl. No.: 16/061,889

(22) PCT Filed: Sep. 30, 2016

(86) PCT No.: PCT/KR2016/010951
§ 371 (c)(1),
(2) Date: Jun. 13, 2018

(87) PCT Pub. No.: WO2017/104951
PCT Pub. Date: Jun. 22, 2017

(65) Prior Publication Data
US 2018/0363254 A1    Dec. 20, 2018

(30) Foreign Application Priority Data

Dec. 15, 2015    (KR) .................. 10-2015-0179112

(51) Int. Cl.
*E04B 1/36*    (2006.01)
*E04H 9/02*    (2006.01)
(Continued)

(52) U.S. Cl.
CPC .......... *E01D 19/041* (2013.01); *E01D 19/04* (2013.01); *E04B 1/36* (2013.01); *E04B 1/98* (2013.01);
(Continued)

(58) Field of Classification Search
CPC ... E04B 1/36; E04B 1/98; E04H 9/021; E01D 19/04; E01D 19/041
See application file for complete search history.

(56) References Cited

U.S. PATENT DOCUMENTS 3,782,788 A * 1/1974 Koester .................. E01D 19/04
                                                    14/73.5
4,887,788 A * 12/1989 Fischer ................. E01D 19/041
                                                    248/562
(Continued)

FOREIGN PATENT DOCUMENTS

JP    2006-258225 A    9/2006
JP    2014-047893 A    3/2014
(Continued)

OTHER PUBLICATIONS

International Search Report issued in the corresponding application No. PCT/KR2016/010951 dated Jan. 12, 2017.

*Primary Examiner* — Paola Agudelo
(74) *Attorney, Agent, or Firm* — Roberts Mlotkowski Safran Cole & Calderon P.C.

(57) ABSTRACT

Disclosed is a friction damper that has a unique load-displacement hysteresis characteristic such that, when the frictional coefficient between members that generate friction is smaller than the slope of an inclined surface, the friction damper is always returned to the original position thereof in a case where an external force is removed or remains at a level that does not exceed a threshold value. The V-groove friction damper includes: a V-groove member including a concave V-shaped groove; a V-shaped frictional contact member including a V-shaped frictional contact portion; a guide member configured to guide a left/right movement of the V-groove member; and an elastic compression unit
(Continued)

installed on the guide member, and configured to elastically compress the V-shaped frictional contact member toward the V-groove member.

20 Claims, 7 Drawing Sheets

(51) Int. Cl.
    *E01D 19/04*     (2006.01)
    *F16F 15/04*     (2006.01)
    *E04B 1/98*     (2006.01)
    *F16F 7/09*     (2006.01)

(52) U.S. Cl.
    CPC ............. *E04H 9/021* (2013.01); *F16F 7/095* (2013.01); *F16F 15/04* (2013.01)

(56) References Cited

U.S. PATENT DOCUMENTS

| | | | | |
|---|---|---|---|---|
| 9,175,468 B1* | 11/2015 | Tsai | ........................... | E04B 1/36 |
| 10,106,979 B2* | 10/2018 | Lee | ........................... | E04B 1/98 |
| 2003/0167707 A1* | 9/2003 | Tsai | ........................ | E01D 19/04 |
| | | | | 52/167.5 |
| 2005/0257451 A1* | 11/2005 | Pryor | .................... | E04B 1/2403 |
| | | | | 52/167.4 |
| 2014/0026498 A1* | 1/2014 | Quaglini | ............... | E01D 19/046 |
| | | | | 52/167.4 |
| 2015/0184413 A1* | 7/2015 | Pryor | ...................... | E04H 9/021 |
| | | | | 52/167.3 |
| 2015/0259899 A1* | 9/2015 | Tsai | ........................ | E04B 1/98 |
| | | | | 248/542 |
| 2016/0115703 A1* | 4/2016 | Katayama | ................. | E04H 9/02 |
| | | | | 52/167.8 |
| 2018/0142434 A1* | 5/2018 | Yu | ........................... | E01D 19/04 |
| 2018/0195267 A1* | 7/2018 | Massa | ..................... | E04H 9/021 |

FOREIGN PATENT DOCUMENTS

| | | |
|---|---|---|
| KR | 10-1200692 B1 | 11/2012 |
| KR | 10-1438707 B1 | 9/2014 |
| KR | 10-1512122 B1 | 4/2015 |

* cited by examiner

[Fig. 1]
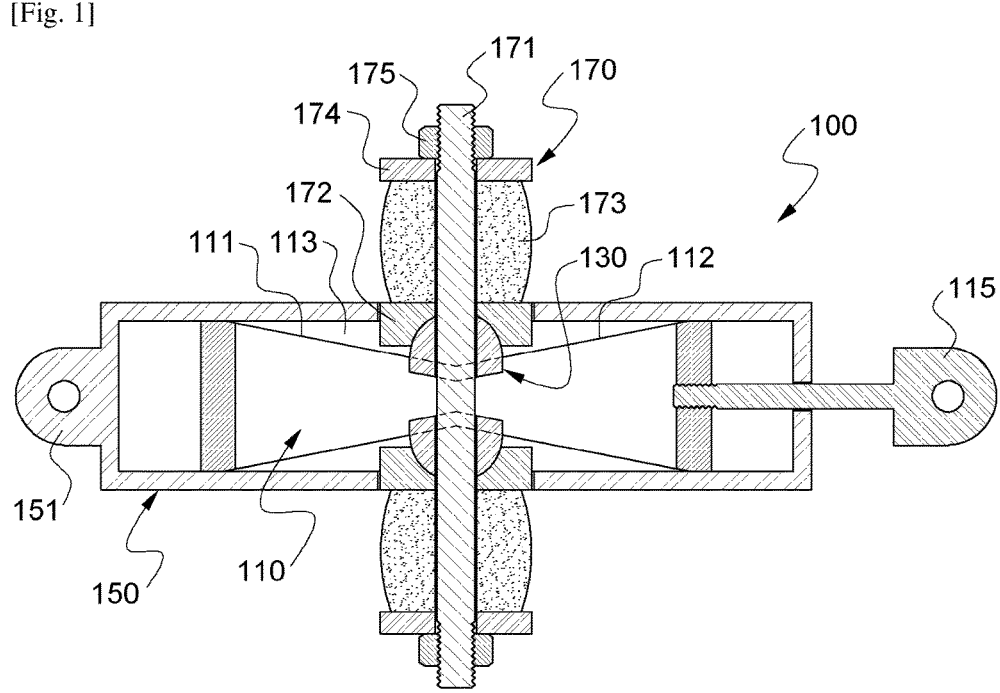
[Fig. 2]
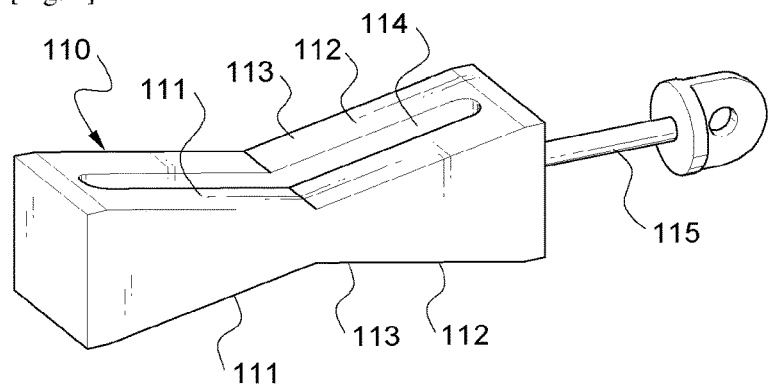
[Fig. 3]
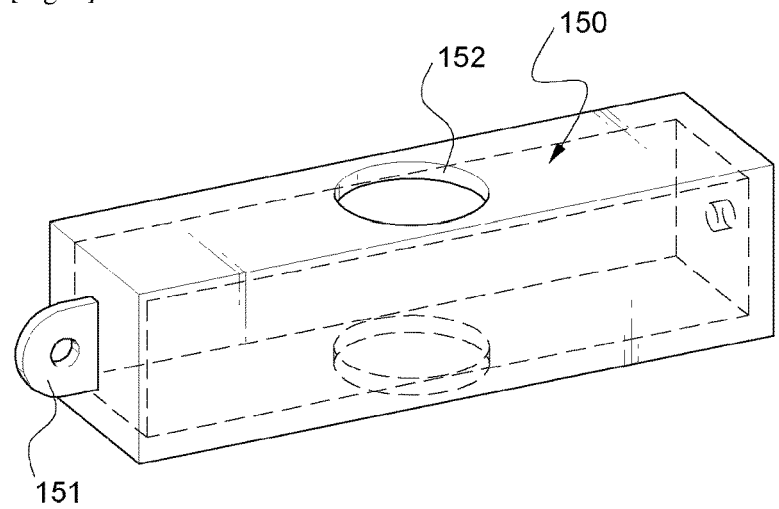

[Fig. 4]
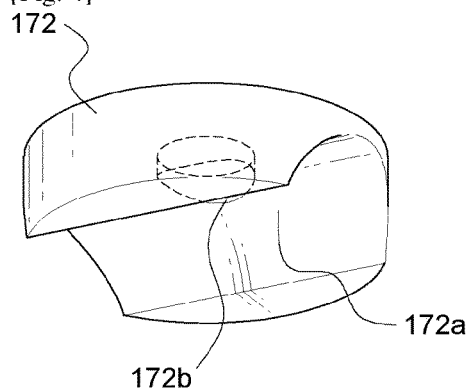
[Fig. 5]
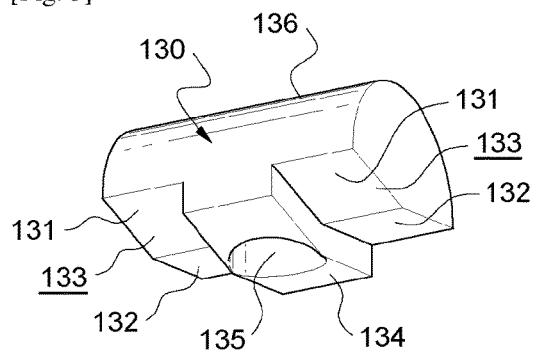
[Fig. 6]
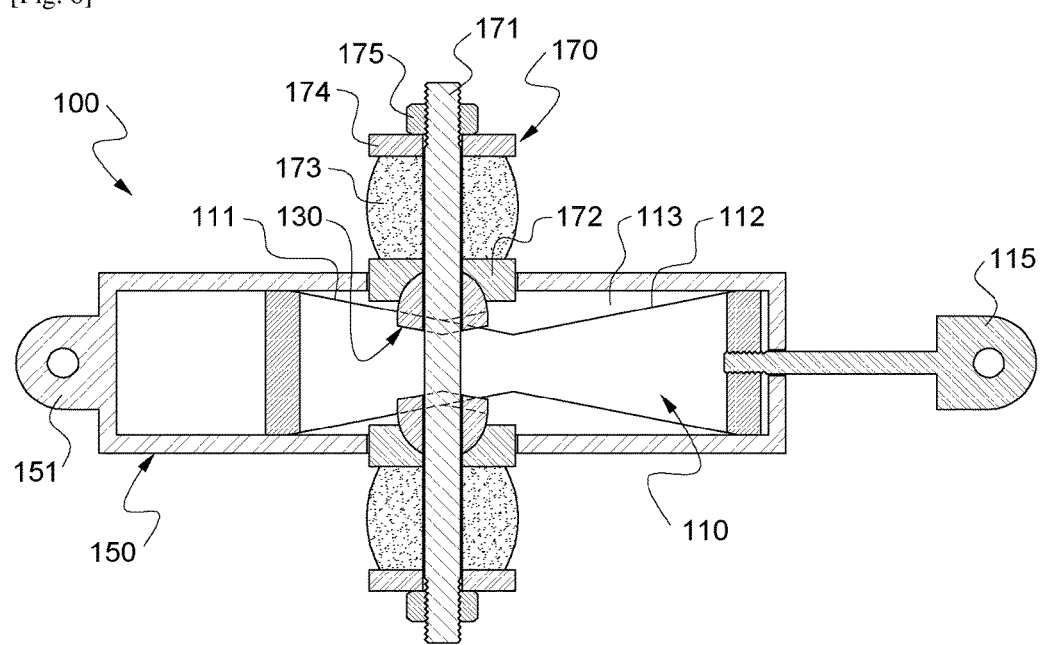

[Fig. 7]
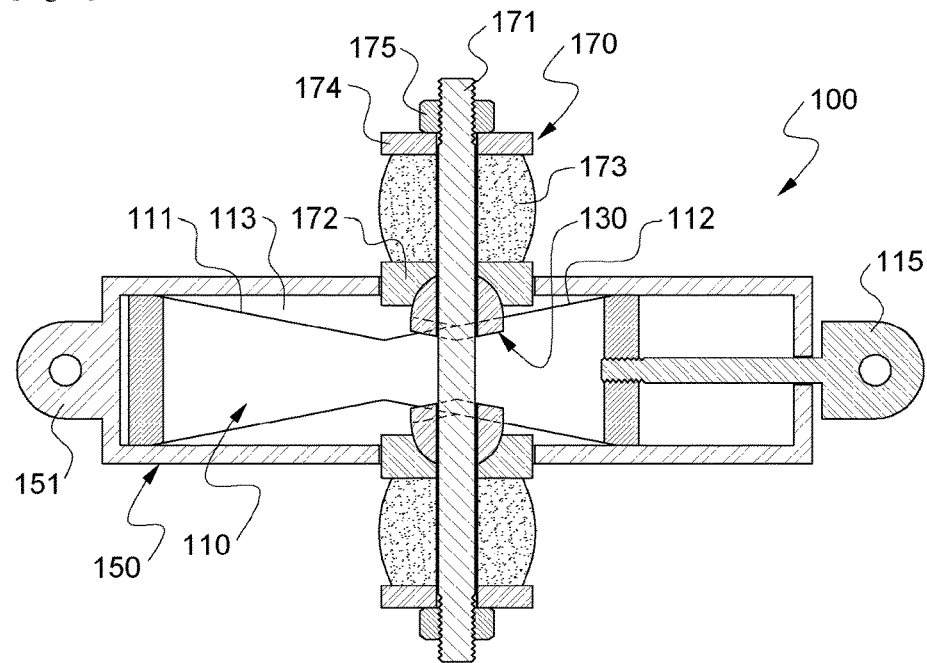
[Fig. 8]
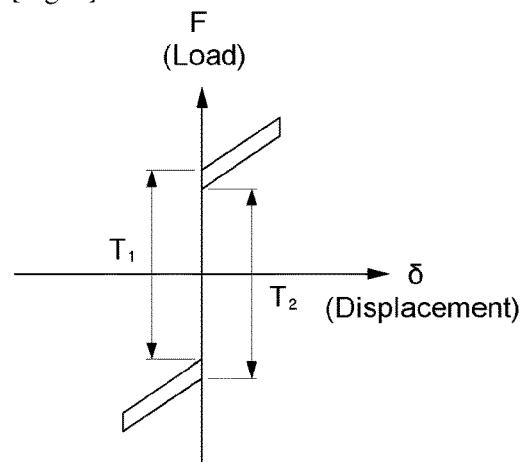
[Fig. 9]
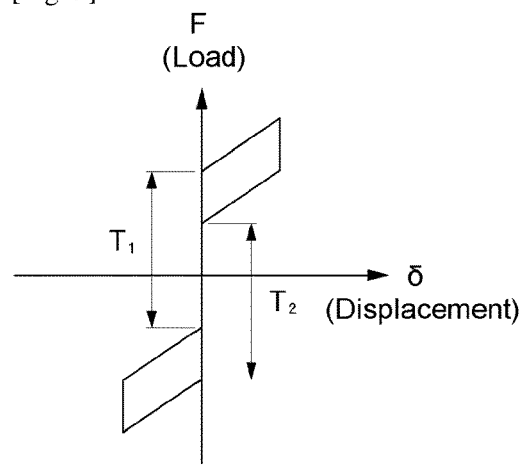

[Fig. 10]
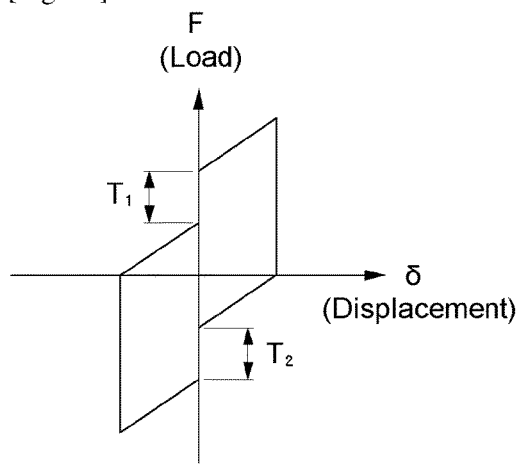
[Fig. 11]
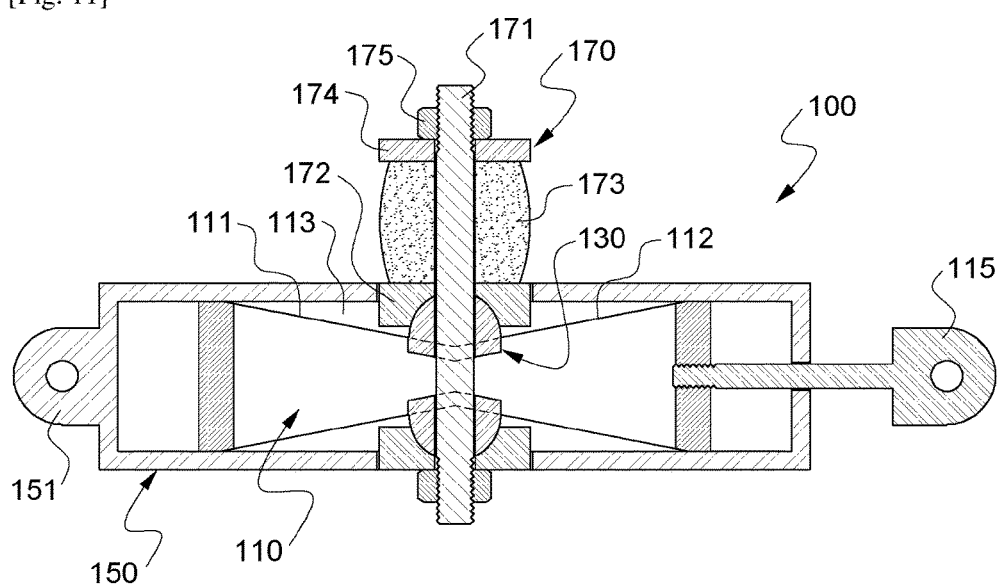

[Fig. 12]
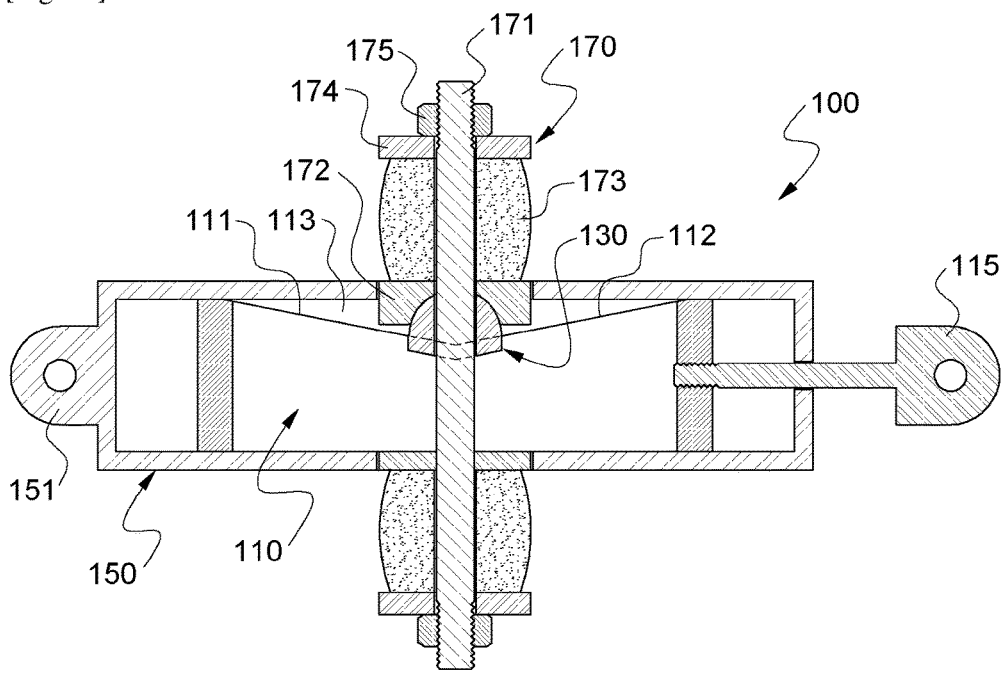
[Fig. 13]
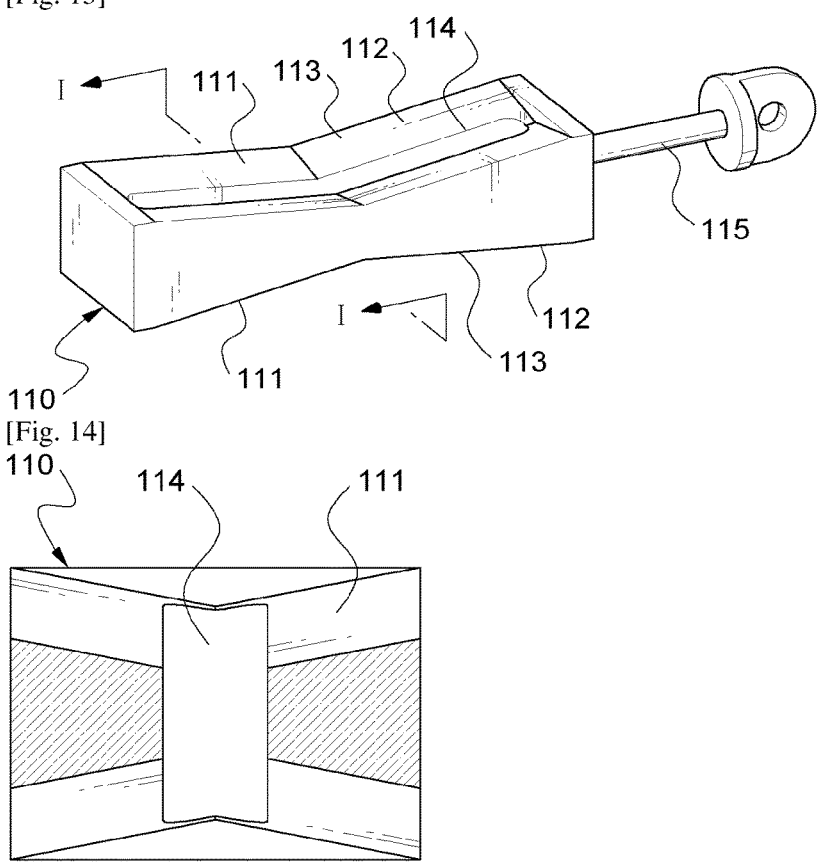
[Fig. 14]

[Fig. 15]
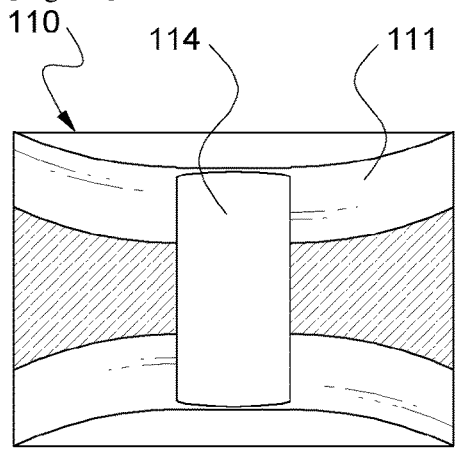
[Fig. 16]
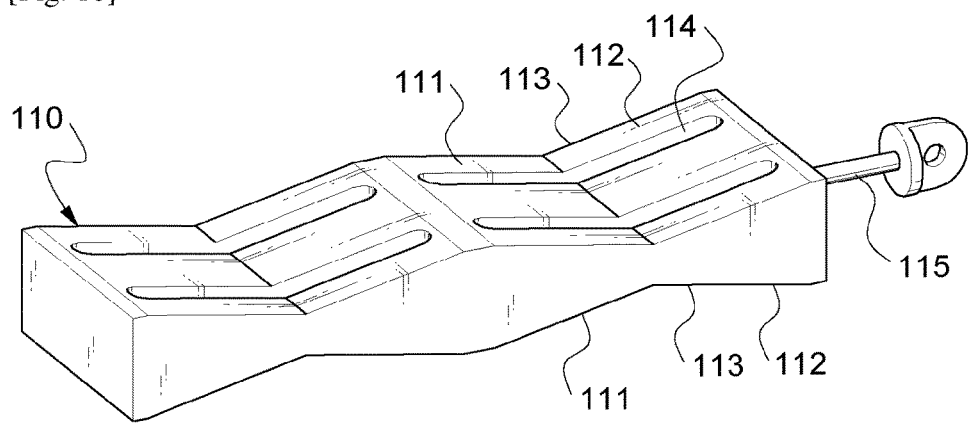
[Fig. 17]
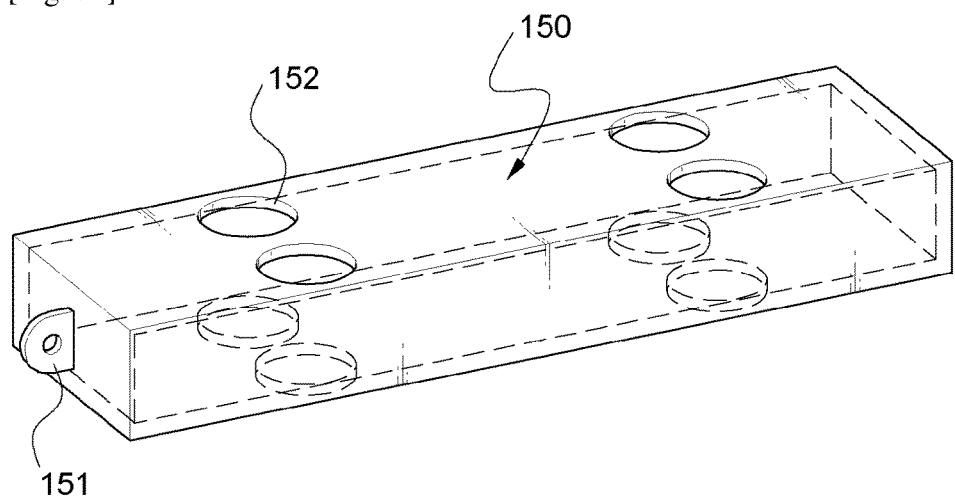

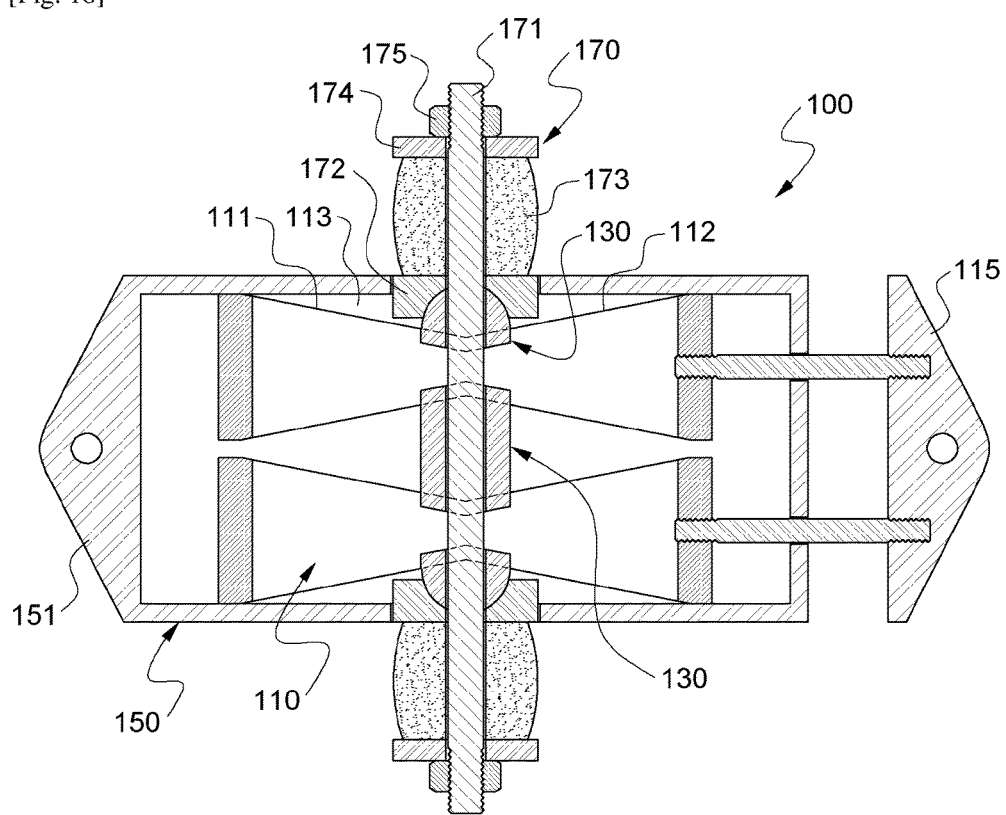
[Fig. 18]

FRICTION DAMPER WITH V-GROOVE

CROSS-REFERENCE TO RELATED APPLICATIONS

The present application is a U.S. National Phase of PCT/KR2016/010951 filed on Sep. 30, 2016 claiming priority to Korean Patent Application No. 10-2015-0179112 filed Dec. 15, 2015. The disclosure of the PCT Application is hereby incorporated by reference into the present Application.

TECHNICAL FIELD

The present invention relates to an improvement of a damper. In particular, the present invention relates to an improvement of a damper that may be installed between two structures that are allowed to relatively move therebetween, like a pier and a bridge upper plate, so as to buffer and absorb a shock that acts between the two structures, and may also be properly used for reinforcing earthquake resistance of building, controlling a displacement of a tall building, which is caused by a wind load, or used for instead of a sway brace controlling a pipe vibration of a plant, such as a power plant.

BACKGROUND ART

Recently, the strength and frequencies of earth quakes have increased globally, and due to this, an earthquake-resistant design of important facilities, such as a bridge, a building, and a nuclear power plant has become increasingly important. In particular, when a large displacement is generated in a pipe that is directly concerned with the safety of a nuclear power plant, a great problem may be caused in the nuclear power plant. The need for a pipe support technique is increasing in order to prevent losses caused by pipe damage.

In a vibration-proofing system for supporting a pipe in a nuclear power plant as described above, a buffering mechanism is needed in order to stably support the pipe on a support structure, and to buffer and absorb a shock force, such as an earthquake, thereby preventing the pipe from being damaged.

In general, a hydraulic-buffering mechanism, which has been used in a bridge in order to buffer and absorb a shock force that abruptly acts between two structures by an earthquakes or the like while receiving a normal load that gradually acts between the two structures, is composed of: a cylinder that is filled with a hydraulic fluid; a piston that is movably installed within the cylinder and is formed with orifices; and a rod that is connected to the piston.

Such a conventional hydraulic-buffering mechanism is difficult to manufacture, maintain, and repair because it is necessary to maintain fluid-tightness in the cylinder. Accordingly, it costs a lot to manufacture the conventional hydraulic-buffering mechanism, and the conventional hydraulic-buffering mechanism is not suitable for use in a nuclear power plant that requires stable performance maintenance for a long period of time.

Further, because the viscosity of the hydraulic fluid is strongly influenced by a temperature change, the conventional hydraulic-buffering mechanism has a disadvantage in that it suffers from a serious performance deviation depending on a temperature.

In addition, the conventional hydraulic-buffering mechanism has a problem in that its shock absorption is unsatisfactory.

Further, the conventional hydraulic-buffering mechanism also has a problem in that it is difficult to adjust the damping performance thereof.

Due to the above-mentioned disadvantages, the conventional hydraulic-buffering mechanism is not suitable as a device for supporting a pipe of a nuclear power plant or the like.

Korean Patent No. 10-1200692 (entitled "Friction Damper" and invented by CHO, Young Cheol and LEE, Yu In (hereinafter, referred to as "Patent Document 1") and Korean Patent No. 10-1512122 (entitled "Pendulum-type Friction Damper and invented by CHO, Young Cheol and CHO, Sung Kook (hereinafter, referred to as "Patent Document 2") disclose inventions developed to solve the problems of the hydraulic-buffering mechanism. The disclosures of Patent Documents 1 and 2 are incorporated herein in their entireties by reference.

DISCLOSURE OF INVENTION

Technical Problem

The inventor has found that the friction dampers of Patent Documents 1 and 2 solve various problems of the conventional hydraulic buffering mechanism and exhibit an excellent performance to be suitable to be used for supporting a pipe in a nuclear power plant. However, because the contact face between the frictional contact member and the concave member is formed in a curved surface, and the entire surface of the frictional contact member, which faces the concave member in the entire friction section, comes in contact with the concave member such that the load and the displacement in a load-displacement hysteresis curve have an approximately proportional relationship in the entire section.

Accordingly, there is a problem in that, even if the external force applied between the concave member and the frictional contact member is removed in the state where the concave member is displaced in the left/right direction with respect to the frictional contact member, the frictional contact member cannot be returned to the original position thereof.

In addition, the friction dampers of Patent Documents 1 and 2 have a disadvantage in that the stability for the initial position is poor because the magnitude of the change rate of the force is constant in the entire section regardless of the initial position or the position displaced in the left/right direction.

An object of the present invention is to provide a friction damper that is always returned to the original position thereof when an external force is removed, and the stability at the initial position is excellent.

Another object of the present invention is to provide a friction damper that is excellent in returning performance to the initial position thereof such that the friction damper is returned to the original position thereof even if an external force remains at a level that does not exceed a predetermined magnitude (a threshold value).

Still another object of the present invention is to provide a friction damper that can be made while variously adjusting the magnitude of the threshold value.

Still another object of the present invention is to provide a friction damper that can variously adjust a load-displacement hysteresis characteristic.

Yet another object of the present invention is to provide a friction damper having a load-displacement hysteresis characteristic that is different from that of the friction dampers disclosed in Patent Documents 1 and 2.

Solution to Problem

A friction damper according to the present disclosure includes: a V-groove member including a concave V-shaped groove that is formed on at least one of a top surface and a bottom surface thereof as a left inclined surface and a right inclined surface meets each other at a central portion of a left/right direction, each of the left inclined surface and the right inclined surface being arranged along a straight line in the left/right direction; a V-shaped frictional contact member including a V-shaped frictional contact portion having a left contact surface that comes in contact with the left inclined surface and a right contact surface that comes in contact with the right inclined surface by being coupled to the central portion in the left/right direction, each of the left inclined surface and the right contact surface being arranged along a straight line in the left/right direction; a guide member configured to guide a left/right movement of the V-groove member; and an elastic compression unit installed on the guide member, and configured to elastically compress the V-shaped frictional contact member toward the V-groove member. When the V-shaped frictional contact member is positioned at a left side of the central portion of the left/right direction, only the left contact surface is in plane contact with, and elastically compresses, the left inclined surface so as to provide a restoring force to move the V-groove member leftward, and when the V-shaped frictional contact member is positioned at a right side of the central portion of the left/right direction, only the right contact surface is in plane contact with, and elastically compresses, the right inclined surface so as to provide a restoring force to move the V-groove member rightward.

A frictional coefficient between the left contact surface and the left inclined surface may be smaller than a slope of the left inclined surface, and a frictional coefficient between the right contact surface and the right inclined surface may be smaller than a slope of the right inclined surface such that the V-groove member may be returned to the original position thereof when an external force is removed.

A frictional coefficient between the left contact surface and the left inclined surface may be smaller than a slope of the left inclined surface, and a frictional coefficient between the right contact surface and the right inclined surface may be smaller than a slope of the right inclined surface such that the V-groove member may be returned to an original position thereof when an external force becomes equal to or less than a threshold value of a predetermined magnitude.

The V-shaped groove may be formed on both of the top and bottom surfaces of the V-groove member, and the V-shaped frictional contact member may be installed in both of the V-shaped grooves of the top and bottom surfaces.

The V-groove member may include a wobble prevention guided portion that is formed along the left inclined surface and the right inclined surface, and the V-shaped frictional contact member may be provided with a wobble prevention guiding portion that is coupled to the wobble prevention guided portion so as to guide the wobble prevention guided portion.

The elastic compression unit may include: a shaft member that vertically passes through the V-groove member and the V-shaped frictional contact member, and allows the v-groove member to move leftward and rightward; an elastic body coupled to an outer peripheral surface of the shaft member, and disposed outside the V-shaped frictional contact member; an up-down member coupled to the outer peripheral surface of the shaft member to be movable up and down, and disposed outside the elastic body; and a compression member coupled to the shaft member so as to compress the up-down member toward the elastic body.

The outer surface of the V-shaped frictional contact member may be formed as a convex cylindrical surface or a convex spherical shape. A cover member may be coupled to the outer peripheral surface of the shaft member between the elastic body and the V-shaped frictional contact member to be movable up and down. The cover member may include a concave cylindrical surface or a concave spherical surface coupled to the convex cylindrical surface or the spherical surface. The guide member may include an up-down guide portion formed to guide an upward/downward movement of the cover member.

The V-shaped frictional contact member may be formed of an engineering plastic, and an end of each of the guide member and the V-groove member may be provided with a connection part to be connected to another member.

The V-shaped groove, the V-shaped frictional contact member, and the elastic compression unit may be plurally provided in the front/back direction, in the left/right direction, or in the front/back and left/right directions.

One or more pairs of V-groove members may be vertically installed, and the V-shaped frictional contact member may be provided in each of the V-groove members.

Advantageous Effects of Invention

According to the present invention, it is possible to provide a friction damper that has a distinctive characteristic as compared to the friction dampers of Patent Documents 1 and 2, and is excellent in restoring performance in that, when the frictional coefficient between members is smaller than the slope of the inclined surface, the friction damper is always returned to the original position thereof in a case where an external force is removed or remains at a level that does not exceed a threshold value.

According to the present invention, it is possible to provide a friction damper having a load-displacement hysteresis characteristic that is adjusted to be suitable for a situation of the ground.

According to the present invention, the magnitude of a threshold value, which enables friction members to return to the original position, can be variously adjusted by adjusting the frictional coefficient between the friction members and the slope of the inclined surface.

According to the present invention, because vibrations generated by a vibrating force smaller than the threshold value can be prevented, it is possible to extend the lifespan of a pipe or the like.

BRIEF DESCRIPTION OF DRAWINGS

FIG. 1 is a sectional view of a V-groove friction damper according to the present invention;

FIG. 2 is a perspective view of a V-groove member illustrated in FIG. 1;

FIG. 3 is a perspective view of a guide member illustrated in FIG. 1;

FIG. 4 is a perspective view of a cover member illustrated in FIG. 1;

FIG. 5 is a perspective view of a V-shaped frictional contact member illustrated in FIG. 1;

FIG. 6 is a sectional view illustrating a state in which the V-groove member of FIG. 1 is moved rightward;

FIG. 7 is a sectional view illustrating a state in which the V-groove member of FIG. 1 is moved leftward;

FIGS. 8 to 10 are graphs each illustrating a change in a load-displacement hysteresis curve depending on a change of the frictional coefficient of a V-groove friction damper, in which FIGS. 8 to 10 illustrate a case in which the frictional coefficient is small, a case in which the frictional coefficient is proper, and a case in which the frictional coefficient is large, respectively;

FIGS. 11 and 12 are sectional views illustrating other examples of the V-groove friction damper according to the present invention, respectively;

FIG. 13 is a perspective view for describing a modification of the V-groove member according to the present invention;

FIG. 14 is a sectional view taken along line I-I in FIG. 13;

FIG. 15 is a sectional view illustrating a modification of that illustrated in FIG. 14;

FIGS. 16 and 17 are perspective views illustrating modifications of the V-groove member and the guide member, respectively; and FIG. 18 is a sectional view for describing still another embodiment of the V-groove friction damper according to the present invention.

BEST MODE FOR CARRYING OUT THE INVENTION

Hereinafter, embodiments of the present invention will be described in detail with reference to the accompanying drawings.

FIG. 1 is a sectional view of a V-groove friction damper according to the present invention, FIG. 2 is a perspective view of a V-groove member illustrated in FIG. 1, and FIG. 3 is a perspective view of a guide member illustrated in FIG. 1. FIG. 4 is a perspective view of a cover member illustrated in FIG. 1, and FIG. 5 is a perspective view of a V-shaped frictional contact member illustrated in FIG. 1. Further, FIG. 6 is a sectional view illustrating a state in which the V-groove member of FIG. 1 is moved rightward, and FIG. 7 is a sectional view illustrating a state in which the V-groove member of FIG. 1 is moved leftward.

As illustrated in FIGS. 1 to 7, a V-groove friction damper 100 according to the present invention includes a V-groove member 110, a V-shaped frictional contact member 130, a guide member 150, and an elastic compression unit 170.

The V-groove member 110 has, on each of top and bottom sides thereof, a concave V-shaped groove 113 that is formed as a left inclined surface 111 and a right inclined surface 112 meet each other at the center at the left/right direction thereof. In the embodiment, both the left inclined surface 111 and the right inclined surface 112 are constituted with a flat surface.

Occasionally, the left inclined surface 111 and the right inclined surface 112 may be arranged along a curve in the back and forth direction (a direction in which the relative movement between the V-groove member 110 and the V-shaped frictional contact member 130 is suppressed). However, the left inclined surface 111 and the right inclined surface 112 should always be arranged along a straight line in the left and right direction (a direction of the relative movement between the V-groove member 110 and the V-shaped frictional contact member 130).

As can be seen from FIG. 2, the V-groove member 110 has a wobble prevention guided portion 114 that is formed along the left inclined surface 111 and the right inclined surface 112. The wobble prevention guided portion 114 functions to prevent the V-groove member 110 and the V-shaped frictional contact member 130 from wobbling in relation to each other in the back and forth direction by being guided by the V-shaped frictional contact member 130 when the V-groove member 110 performs a relative movement in the left and right direction in relation to the V-shaped frictional contact member 130, and has a long slot shape arranged to be elongated in the left and right direction. The wobble prevention guided portion 114 allows the V-groove member 110 to be moved rightward and leftward as illustrated in FIGS. 6 and 7 in a state where a shaft member 171 of the elastic compression unit 170 to be described later vertically passes therethrough.

Occasionally, the prevention of back and forth play or wobble between the V-groove member 110 and the V-shaped frictional contact member 130 may also be performed by the guide member 150 to be described later.

The opposite ends of the V-groove member 110 as described above are formed to preferably have a cross-section that is the same as the inner surfaces of the guide member 150 to be capable of being guided by the inner surfaces of the guide member 150. A connection part 115 is provided on one end of the V-groove member 110 to be connected to another member.

As can be seen from FIG. 1 and FIGS. 5 to 7, the V-shaped frictional contact member 130 includes a V-shaped frictional contact portion 133 having a left contact surface 131 and a right contact surface 132. In the state where the V-shaped frictional contact portion 133 is coupled to the center in the left/right direction of the left inclined surface 111 and the right inclined surface 112 as illustrated in FIG. 1, the left contact surface 131 is in contact with the left inclined surface 111 and the right inclined surface 132 is in contact with the right inclined surface 112. Each of the left contact surface 131 and the right contact surface 132 is preferably constituted with a flat surface.

Occasionally, the left contact surface 131 and the right contact surface 132 may also be arranged along a curved line in the back and forth direction, like the left inclined surface 111 and the right inclined surface 112. However, the left contact surface 131 and the right contact surface 132 should also be arranged along a straight line in the left/right direction.

As illustrated in FIG. 5, the V-shaped frictional contact member 130 includes a wobble prevention guide portion 134 between opposite left contact surfaces 131 and opposite right contact surfaces 132. When the wobble prevention guide portion 134 is coupled to the wobble prevention guided portion 114 of the V-groove member 110 illustrated in FIG. 2 and the V-groove member 110 is moved leftward and rightward, the wobble prevention guide portion 134 functions to prevent the V-groove member 110 from wobbling in the back and forth direction while guiding the left and right movement of the V-groove member 110.

In addition, the V-shaped frictional contact member 130 is provided with a through-hole 135 that allows the shaft member 171 of the elastic compression unit 170 to vertically pass therethrough, and the V-shaped frictional contact member 130 is installed to be vertically movable along the shaft member 171 in the state of being coupled to the outer peripheral surface of the shaft member 171.

The outer surface of the V-shaped frictional contact member 130 is preferably formed as a convex cylindrical surface 136, and is supported by a concave cylindrical surface 172a of the cover member 172 to be described later. As such, when a large force is applied to the V-shaped frictional contact member 130 in the left a right direction, the V-shaped frictional contact member 130 is allowed to slightly pivot so as to buffer the shock. Further, for example, when the V-groove member 110 is moved rightward from the state of FIG. 1 and thus, the V-shaped frictional contact member 130 receives a large force to the right side in the state where the left contact surface 131 is in contact with the left inclined surface 111, the right side surface of the concave cylindrical surface 172a may bear the right side surface of the V-shaped frictional contact member 130 so as to prevent an excessive force from being applied to the shaft member 171.

Occasionally, the convex cylindrical surface 136 may be formed in a convex spherical surface. Further, the V-shaped frictional contact member 130 may be installed not to pivot by forming each of the top surface of the V-shaped frictional contact member 130 and the corresponding surface of the concave cylindrical surface 172a, which is formed on the cover member 172, as a flat surface.

While the V-shaped frictional contact member 130 may be made of a steel material so as to have a strength that is capable of sufficiently bearing the pressure of the elastic compression unit 170, a high strength engineering plastic may also be used for the V-shaped frictional contact member 130. As the engineering plastic, Ultra-high molecular weight PE (UPE), nylon, or the like may be used. The other details are described in detail in Patent Document 2.

When the V-shaped frictional contact member 130 is made of the engineering plastic, rather than a metallic material, it is not necessary to provide a separate sliding member on the contact surfaces. Of course, however, sliding members, which are different from each other in terms of a sliding characteristic, may be provided and used on the surfaces of frictional contact portions. When the V-shaped frictional contact member 130 is made of a metallic material, it is desirable that a separate sliding member is provided and used on the frictional surfaces thereof.

Referring to FIGS. 1, 3, 6 and 7, the guide member 150 guides the left and right movements of the V-groove member 110 and provides an installation place of the elastic compression unit 170. The guide member 150 is connected to a member other than the V-groove member 110, and thus, is provided with a connection part 151 at an end opposite to the V-groove member 110. In addition, an up-down guide portion 152 is formed in the guide member 150 so as to provide the installation place of the elastic compression unit 170 and to guide the vertical movement of the cover member 172. In this embodiment, the up-down guide portion 152 is formed in the form of a through-hole that vertically penetrates the guide member 150.

Referring to FIGS. 1, 6, and 7, the V-groove friction damper 100 according to the present invention is provided with an elastic compression unit 170 that elastically compresses the V-shaped frictional contact member 130 toward the V-groove member 110 in the state of being installed in the guide member 150. The elastic compression unit 170 includes a shaft member 171, an elastic body 173, an up-down member 174 coupled to the shaft member 171 to be movable up and down in the outside of the elastic body 173, and a compression member 175 configured to compress the up-down member 174 toward the elastic body 173.

In this embodiment, the shaft member 171 should allow the leftward and rightward movements of the V-groove member 110 while vertically passing through the V-groove member 110 and the V-shaped frictional contact member 130. Preferably, the shaft member 171 is configured to vertically pass through the elastic body 173 as well. The compression member 175 is preferably formed of a nut that is screwed to the shaft member 171 so as to press the up-down member 174 toward the elastic body 173. The nut may be dually installed in order to prevent the nut from being loosened, or may be installed not to be loosened with the aid of a loosening prevention means.

Preferably, the V-shaped frictional contact member 130, the cover member 172, the elastic body 173, the up-down member 174, and the compression member 175 are installed at each of the top side and the bottom side.

As the elastic body 173, a Mass Energy Regulator (MER) spring is desirable which is formed of polyurethane having a rubber hardness in the range of 80 A to 100 A, but other springs, such as a coil spring and a disc spring, may be used.

Preferably, the V-groove friction damper 100 further includes the cover member 172 coupled to the shaft member 171 to be movable up and down inside the elastic body 173 and is configured to press the V-shaped frictional contact member 130 toward the V-groove member 110 using the compressive force of the elastic body 173. The cover member 172 includes a concave cylindrical surface 172a that is formed to correspond to the outer surface of the V-shaped frictional contact member 130. Instead of the concave cylindrical surface 172a, a concave spherical surface may be formed. The through-hole 172b is also perforated in the cover member 172.

The elastic compression unit 170 is disclosed in detail in Patent Documents 1 and 2.

In the V-groove friction damper 100 with the above-described configuration according to the present invention, when the V-shaped frictional contact member 130 is positioned at the left side of the center in the left/right direction of the V-groove member 110 as illustrated in FIG. 6, only the left contact surface 131 elastically compresses the left inclined surface 111 in the state of being in plane contact with the left inclined surface 111. Accordingly, the V-shaped frictional contact member 130 applies a force on the left inclined surface 111 to move the V-groove member 110 leftward so as to return the V-groove member 110 to its original position. On the contrary, when the V-shaped frictional contact member 130 is positioned at the right side of the center in the left/right direction of the V-groove member 110 as illustrated in FIG. 7, only the right contact surface 132 elastically compresses the right inclined surface 112 in the state of being in plane contact with the right inclined surface 112. Accordingly, the V-shaped frictional contact member 130 applies a force on the right inclined surface 112 to move the V-groove member 110 rightward so as to return the V-groove member 110 to its original position.

Accordingly, when the frictional coefficient between the left inclined surface 111 and the left contact surface 131 or the frictional coefficient between the right inclined surface 112 and the right contact surface 132 is smaller than the slope (tan θ) of the corresponding inclined surface, or when an external force is removed or is equal to or less than a threshold value, the V-groove member 110 is always returned to its original position. Here, θ is an inclined angle of an inclined surface in relation to a horizontal surface.

In the above-described V-groove friction damper 100 according to present invention, in the state where an external force is removed, and thus, the V-groove member 110 is returned to the original position thereof, the V-groove member 110 does not move until a force having a force of a predetermined magnitude (hereinafter, referred to as a "threshold value") is applied to the V-groove member 110 leftward or rightward.

FIGS. 8 to 10 are graphs each illustrating a change in a load-displacement hysteresis curve depending on a change of the frictional coefficient of a V-groove friction damper, in which FIGS. 8 to 10 illustrate a case in which the frictional coefficient is small, a case in which the frictional coefficient is proper, and a case in which the frictional coefficient is large, respectively. FIG. 10 illustrates a case where the frictional coefficient is larger than the slope.

The load-displacement hysteresis curve represented in FIG. 8 of Patent Document 1, the load-displacement hysteresis curve represented FIG. 20 in the detailed description of the invention in Patent Document 2, or the like forms a parallelogram, and a change rate of each hysteresis curve in the central portion in the left/right direction thereof where the displacement is 0 is substantially equal to the change rate in any other portion.

On the contrary, a load-displacement hysteresis curve according to the present invention has a unique hysteresis characteristic in that no displacement is generated in the central portion in the left/right direction where the displacement is 0 until there is a load change of a predetermined magnitude that occurs according to a frictional coefficient.

In FIGS. 8 to 10, T1 represents a magnitude of a load change until the V-shaped frictional contact member 130 moves again along the right inclined surface 112 after having returned to the original position from the left inclined surface 111, and T2 represents a magnitude of a load change until the V-shaped frictional contact member 130 moves again along the left inclined surface 111 after having returned to the original position from the right inclined surface 112.

Accordingly, the V-groove friction damper 100 according to the present invention is configured such that the frictional coefficient between the left contact surface 131 and the left inclined surface 111 is smaller than the slope of the left inclined surface 111, and the frictional coefficient between the right contact surface 132 and the right inclined surface 112 is smaller than the slope of the right inclined surface 112. Thus, when an external force is removed, the V-groove member 110 is of course returned to its original position, and when the external force merely becomes equal to or less than the above-mentioned threshold value, the V-groove member 110 may be returned to its original position.

As can be seen from FIGS. 8 to 10, as the frictional coefficient between the members that produces a friction is changed, the V-groove friction damper 100 according to the present invention may be designed to have various load-displacement hysteresis characteristics. The V-groove friction damper 100 may be designed to have more diversified load-displacement hysteresis characteristics by changing the slopes of the left inclined surface 111 and the right inclined surface 112.

That is, when the V-groove friction damper 100 according to the present invention is used, the V-groove friction damper 100 can be designed according to a use environment or condition by easily adjusting the load-displacement hysteresis characteristics to be suitable for the use environment or condition.

Mode for the Invention

FIGS. 11 and 12 are sectional views illustrating other examples of the V-groove friction damper according to the present invention, respectively.

Occasionally, an elastic body 173 may be installed on only one of the top and bottom surfaces, as illustrated in FIG. 11.

In addition, the left inclined surface 111 and the right inclined surface 112, the V-shaped frictional contact member 130 etc. may also be provided on only one of the top and bottom surfaces. The others are the same as those described above with reference to FIGS. 1 to 10.

FIG. 13 is a perspective view for describing a modification of the V-groove member according to the present invention, FIG. 14 is a sectional view taken along line I-I in FIG. 13, and FIG. 15 is a sectional view illustrating a modification of that illustrated in FIG. 14.

In some cases, the left inclined surface 111 and the right inclined surface 112 may be constituted with flat surfaces that are inclined (downwards or upwards) toward the center in the front/rear direction where the wobble prevention guided portion 114 exists, as illustrated in FIGS. 13 and 14. In this case, it is necessary to form the V-shaped frictional contact portion 133 of the V-shaped frictional contact member 130 in a shape that corresponds to the left inclined surface 111 and the right inclined surface 112. In this way, the forward/backward wobble may be prevented, and the friction area may be increased.

In addition, in some cases, the left inclined surface 111 and the right inclined surface 112 may be formed as curved surfaces that are inclined toward the center in the front/rear direction where the wobble prevention guided portion 114 exists, as illustrated in FIG. 15.

The others are the same as those described above with reference to FIGS. 1 to 10.

FIGS. 16 and 17 are perspective views illustrating modifications of the V-groove member and the guide member, respectively.

In some cases, two or more V-shaped grooves 113 may be formed in the left/right longitudinal direction or in the front/back widthwise direction on the V-groove member 110. Furthermore, two or more V-shaped grooves 113 may be formed in each of the left/right direction and the front/back direction on the V-groove member 110. The above-described V-shaped frictional contact member 130 may be installed in each of the V-shaped grooves 113, and an elastic compression unit 170 may be installed in the guide member 150 at each of the positions corresponding to the V-shaped grooves 113. In such a case, a plurality of up-down guide portions 152 may be formed in the guide member 150, as illustrated in FIG. 17. In addition, in some cases, a side face of the guide member 150, which is opposite to the connection part 151, may be configured to be entirely opened as illustrated in FIG. 17, but may be closed, only leaving a hole, through which only the connection part 115 of the V-groove member 110 may pass.

While FIGS. 16 and 17 illustrate a case in which two V-shaped grooves 113 or the like are formed in each of the left/right direction and the front/back direction by way of an example, three or more V-shaped grooves may be formed in each of the left/right direction and the front/back direction. In addition, the V-shaped grooves 113 may only be formed in the front/back direction or in the left/right direction.

The other components are the same as those described above with reference to FIGS. 1 to 7.

FIG. 18 is a sectional view for describing still another embodiment of the V-groove friction damper according to the present invention.

In some cases, the V-groove friction damper 100 according to the present disclosure may be configured by vertically arranging V-groove members 110 in layers, and installing the V-shaped frictional contact member 130 between two V-groove members 110. The other components are the same as those described above with reference to FIGS. 1 to 7.

Referring to the above-described embodiments of the present invention and the above-mentioned Patent Documents 1 and 2, it can be appreciated that, in addition to the embodiments exemplified herein, the present invention may be modified and applied in various forms, for example, as follows: forming the guide member in a cylindrical cylinder shape; installing V-groove members, V-shaped frictional contact members, or the like in a plurality of sets in the front/back direction and/or the left/right direction, or vertically arranging V-groove members, V-shaped frictional contact members, or the like in a layered form in two or more layers; and installing shaft members at the opposite sides of the guide member without forming a through-hole, through which the shaft member passes, in the elastic member, the frictional contact member, or the like.

Occasionally, different frictional materials may be installed on the left and right inclined surfaces, respectively, and the slopes of the left and right inclined surfaces may be formed to be different from each other.

INDUSTRIAL APPLICABILITY

The present invention is applicable to support a pipe in a nuclear power plant, and is also applicable to buffer or dissipate a shock force acting between two structures in a bridge, a building structure, or a vehicle by being provided between the two structures.

In addition, the present invention may be configured in such a manner in which V-groove members and V-shaped frictional contact members are installed vertically in two or more layers. Furthermore, when the guide member is formed to be elongated in the left/right direction, and to be wide in the front/back direction, V-shaped grooves are plurally provided in the left/right direction and/or in the front/back direction, a V-shaped frictional contact member is installed in each of the V-shaped grooves, and an elastic compression unit is installed in the guide member at the corresponding position, or the guide members are installed at layers in the form illustrated in FIG. 18, the present invention is applicable to an area where a friction damper having a very large volume is required.

As the elastic compression unit, various kinds of springs may be used, besides a MER spring.

Because it is possible to adjust the magnitude of a slope and the compressing capability of the elastic compression unit so as to greatly improve the resorting capability, the present invention is very useful in an area where returning to the original position is always requested.

In particular, the present invention may also be properly used for reinforcing earthquake resistance of a building, controlling a displacement of a tall building that is caused by a wind load, or used for instead of a sway brace controlling a pipe vibration of a plant, such as a power plant.

The invention claimed is:

1. A V-groove friction damper comprising:
a V-groove member including a concave V-shaped groove that is formed on at least one of a top surface and a bottom surface thereof as a left inclined surface and a right inclined surface meets each other at a central portion of a left/right direction, each of the left inclined surface and the right inclined surface being arranged along a straight line in the left/right direction;
a V-shaped frictional contact member including a V-shaped frictional contact portion having a left contact surface that comes in contact with the left inclined surface and a right contact surface that comes in contact with the right inclined surface by being coupled to the central portion of the left/right direction, each of the left inclined surface and the right contact surface being arranged along a straight line in the left/right direction;
a guide member configured to guide a left/right movement of the V-groove member; and
an elastic compression unit installed on the guide member, and configured to elastically compress the V-shaped frictional contact member toward the V-groove member,
wherein, when the V-shaped frictional contact member is positioned at a left side of the central portion of the left/right direction, only the left contact surface is in plane contact with, and elastically compresses, the left inclined surface so as to provide a restoring force to move the V-groove member leftward, and when the V-shaped frictional contact member is positioned at a right side of the central portion of the left/right direction, only the right contact surface is in plane contact with, and elastically compresses, the right inclined surface so as to provide a restoring force to move the V-groove member rightward.

2. The V-groove friction damper of claim 1, wherein a frictional coefficient between the left contact surface and the left inclined surface is smaller than a slope of the left inclined surface, and a frictional coefficient between the right contact surface and the right inclined surface is smaller than a slope of the right inclined surface such that, when an external force is removed, the V-groove member is returned to the original position thereof.

3. The V-groove friction damper of claim 1, wherein a frictional coefficient between the left contact surface and the left inclined surface is smaller than a slope of the left inclined surface, and a frictional coefficient between the right contact surface and the right inclined surface is smaller than a slope of the right inclined surface such that, when an external force becomes equal to or less than a threshold value of a predetermined magnitude, the V-groove member is returned to an original position thereof.

4. The V-groove friction damper of claim 1, wherein the V-shaped groove is formed on both of the top and bottom surfaces of the V-groove member, and the V-shaped frictional contact member is installed in both of the V-shaped grooves of the top and bottom surfaces.

5. The V-groove friction damper of claim 1, wherein the V-groove member includes a wobble prevention guided portion that is formed along the left inclined surface and the right inclined surface, and
the V-shaped frictional contact member is provided with a wobble prevention guiding portion that is coupled to the wobble prevention guided portion so as to guide the wobble prevention guided portion.

6. The V-groove friction damper of claim 1, wherein the elastic compression unit includes:
a shaft member that vertically passes through the V-groove member and the V-shaped frictional contact member, and allows the v-groove member to move leftward and rightward;
an elastic body coupled to an outer peripheral surface of the shaft member, and disposed outside the V-shaped frictional contact member;
an up-down member coupled to the outer peripheral surface of the shaft member to be movable up and down, and disposed outside the elastic body; and
a compression member coupled to the shaft member so as to compress the up-down member toward the elastic body.

7. The V-groove friction damper of claim 6, wherein an outer surface of the V-shaped frictional contact member is formed as a convex cylindrical surface or a convex spherical shape, and a cover member is coupled to the outer peripheral surface of the shaft member between the elastic body and the V-shaped frictional contact member to be movable up and down and includes a concave cylindrical surface or a concave spherical surface coupled to the convex cylindrical surface or the convex spherical surface, and wherein the guide member includes an up-down guide portion formed to guide an upward/downward movement of the cover member.

8. The V-groove friction damper of claim 1, wherein the V-shaped frictional contact member is formed of an engineering plastic, and wherein an end of each of the guide member and the V-groove member is provided with a connection part to be connected to another member.

9. The V-groove friction damper of claim 1, wherein the V-shaped groove, the V-shaped frictional contact member, and the elastic compression unit are plurally provided in the front/back direction, in the left/right direction, or in the front/back and left/right directions.

10. The V-groove friction damper of claim 1, wherein one or more pairs of V-groove members are vertically installed, and the V-shaped frictional contact member is provided in each of the V-groove members.

11. The V-groove friction damper of claim 2, wherein the V-shaped frictional contact member is formed of an engineering plastic, and wherein an end of each of the guide member and the V-groove member is provided with a connection part to be connected to another member.

12. The V-groove friction damper of claim 3, wherein the V-shaped frictional contact member is formed of an engineering plastic, and wherein an end of each of the guide member and the V-groove member is provided with a connection part to be connected to another member.

13. The V-groove friction damper of claim 4, wherein the V-shaped frictional contact member is formed of an engineering plastic, and wherein an end of each of the guide member and the V-groove member is provided with a connection part to be connected to another member.

14. The V-groove friction damper of claim 2, wherein the V-shaped groove, the V-shaped frictional contact member, and the elastic compression unit are plurally provided in the front/back direction, in the left/right direction, or in the front/back and left/right directions.

15. The V-groove friction damper of claim 3, wherein the V-shaped groove, the V-shaped frictional contact member, and the elastic compression unit are plurally provided in the front/back direction, in the left/right direction, or in the front/back and left/right directions.

16. The V-groove friction damper of claim 4, wherein the V-shaped groove, the V-shaped frictional contact member, and the elastic compression unit are plurally provided in the front/back direction, in the left/right direction, or in the front/back and left/right directions.

17. The V-groove friction damper of claim 2, wherein one or more pairs of V-groove members are vertically installed, and the V-shaped frictional contact member is provided in each of the V-groove members.

18. The V-groove friction damper of claim 3, wherein one or more pairs of V-groove members are vertically installed, and the V-shaped frictional contact member is provided in each of the V-groove members.

19. The V-groove friction damper of claim 4, wherein one or more pairs of V-groove members are vertically installed, and the V-shaped frictional contact member is provided in each of the V-groove members.

20. The V-groove friction damper of claim 5, wherein one or more pairs of V-groove members are vertically installed, and the V-shaped frictional contact member is provided in each of the V-groove members.

* * * * *